United States Patent
Pineau et al.

(10) Patent No.: US 12,384,936 B2
(45) Date of Patent: Aug. 12, 2025

(54) LOW-MELTING COPOLYAMIDE POWDERS

(71) Applicant: Arkema France, Colombes (FR)

(72) Inventors: Quentin Pineau, Serquigny (FR);
Jean-Yves Loze, Serquigny (FR);
Jean-Charles Durand, Serquigny (FR);
Masako Akagi, Kyoto (JP)

(73) Assignee: ARKEMA FRANCE, Puteaux (FR)

( * ) Notice: Subject to any disclaimer, the term of this patent is extended or adjusted under 35 U.S.C. 154(b) by 581 days.

(21) Appl. No.: 17/288,010

(22) PCT Filed: Oct. 23, 2019

(86) PCT No.: PCT/FR2019/052522
§ 371 (c)(1),
(2) Date: Apr. 23, 2021

(87) PCT Pub. No.: WO2020/084252
PCT Pub. Date: Apr. 30, 2020

(65) Prior Publication Data
US 2021/0395567 A1 Dec. 23, 2021

(30) Foreign Application Priority Data

Oct. 24, 2018 (FR) ..................................... 1859818

(51) Int. Cl.
| | | |
|---|---|---|
| C09D 177/06 | (2006.01) |
| B05D 1/06 | (2006.01) |
| B05D 1/22 | (2006.01) |
| C08G 69/26 | (2006.01) |
| C09D 5/03 | (2006.01) |

(52) U.S. Cl.
CPC ............. *C09D 177/06* (2013.01); *B05D 1/06* (2013.01); *B05D 1/22* (2013.01); *C08G 69/265* (2013.01); *C09D 5/031* (2013.01)

(58) Field of Classification Search
CPC .... C08G 69/36; C08G 69/265; C09D 177/00; C09D 177/06; C09D 5/031; C08L 2205/02; C08L 2205/025; C08L 2666/14; C08L 2666/20; C08L 2666/22
See application file for complete search history.

(56) References Cited

U.S. PATENT DOCUMENTS

| | | |
|---|---|---|
| 4,172,161 A | 10/1979 | Feldmann et al. |
| 4,487,895 A | 12/1984 | Feldmann et al. |
| 2002/0031614 A1 | 3/2002 | Waterkamp et al. |
| 2011/0130515 A1 | 6/2011 | Monsheimer et al. |
| 2012/0301736 A1* | 11/2012 | Huraux ................ C09D 177/00 524/378 |
| 2013/0177704 A1 | 7/2013 | Arita et al. |
| 2015/0024130 A1 | 1/2015 | Arita et al. |

FOREIGN PATENT DOCUMENTS

| | | | |
|---|---|---|---|
| CN | 104136539 A | 11/2014 | |
| EP | 0866736 B1 | 9/1998 | |
| FR | 2304998 A1 | 10/1976 | |
| JP | S55-500236 A | 4/1980 | |
| WO | 7900946 A1 | 11/1979 | |
| WO | WO-2018078275 A1 * | 5/2018 | ........... C09D 177/00 |

OTHER PUBLICATIONS

WO-2018078275-A1 machine translaiton (May 3, 2018).*
Office Action (English translation only) mailed on Aug. 14, 2023, by the Japanese Patent Office for Japanese Application No. 2021-522413, 3 pages.
International Search Report (PCT/ISA/210) and Written Opinion (PCT/ISA/237) mailed on Mar. 13, 2020, by the European Patent Office as the International Searching Authority for International Application No. PCT/FR2019/052522.
N'Negue Mintsa, M. et al., "A new UV-curable powder coating based on a a,x-unsaturated copolyamide Jun. 11, 2012", European Polymer Journal 45, pp. 2043-2052, 2009.
Vestamelt et al., "Vestamelt = registered trademark of the Evonik Degussa GmbH Product Information Product Information Product Information Product Information", Retrieved from the Internet: https://adhesives-sealants.evonik.com/product/adhesives-sealants/downloads/pi-vestamelt-x7079-en.pdf, Feb. 28, 2012, XP055612692.
Office Action (The First Office Action) issued on Oct. 20, 2021 by the China National Intellectual Property Administration in corresponding Chinese Patent Application No. 201980077913.4, and an English Translation of the Office Action. (14 pages).

* cited by examiner

*Primary Examiner* — Ana L. Woodward
(74) *Attorney, Agent, or Firm* — Boone IP Law

(57) ABSTRACT

A copolyamide-based powder intended for forming a coating on a surface, having an inherent viscosity of greater than or equal to 0.8 (g/100 g)$^{-1}$, in which the copolyamide has a melting point of less than or equal to 160° C. Also, the use of such a powder for coating a surface, the coating having an inherent viscosity of greater than or equal to 0.8 (g/100 g)$^{-1}$, and also a process for coating a surface using such a powder.

22 Claims, No Drawings

LOW-MELTING COPOLYAMIDE POWDERS

FIELD OF THE INVENTION

The present invention relates to low-melting copolyamide-based powders and to the use of these powders for coating surfaces.

TECHNICAL BACKGROUND

The coating of metal surfaces is very widespread in industry and has a wide variety of applications, notably in the motor vehicle and fluid transfer sectors and in the electrical and electronics industry.

Polyamides are commonly used for coating metal surfaces or other surfaces.

For example, EP 0 866 736 describes a method for coating an aluminium or steel substrate using a powder formed from a polyamide comprising a branched amine.

US 2002/0031614 describes a process of coating with a hot-melt adhesive based on thermoplastic or crosslinkable copolyamide.

FR 2304998 concerns pulverulent plastic coatings obtained by reacting an epoxy compound with a copolyamide.

The article by N'Negue Mintsa et al., *A new UV-curable powder coating based on a α,ω-unsaturated copolyamide 6/11/12*, European Polymer Journal, 2009, vol. 45, pages 2043-2052) and the thesis by N'Negue Mintsa, *Elaboration d'un revêtement "poudre UV" à base de polyamide* [Production of a polyamide-based "UV powder" coating], INSA de Rouen, 2008, describe a coating powder comprising a copolyamide 6/11/12 and a photoinitiator.

U.S. Pat. No. 4,172,161 describes the coating of glass bottles using pulverulent copolyamides containing at least 30% by weight of lauryllactam.

Polyamides may also be used in mastics.

US 2015/0024130 and US 2013/0177704 describe pulverulent mastics comprising a copolyamide resin for encapsulating electronic devices.

In the coating applications, the surface to be covered may be heat-sensitive. For example, the surface may be composed of heat-sensitive metals such as a zinc-aluminium alloy, or may have undergone a heat-sensitive chemical treatment. The heat sensitivity of these surfaces precludes the use of high coating application temperatures, which might damage the surface to be coated.

There is thus a real need to provide polyamide coating powders, notably for coating metal surfaces, which allow application at relatively low temperatures, for example temperatures below 230° C., while at the same time being capable of forming coatings that have good mechanical properties.

SUMMARY OF THE INVENTION

The invention relates firstly to a copolyamide-based powder intended for forming a coating on a surface, having an inherent viscosity of greater than or equal to 0.8 $(g/100 \, g)^{-1}$, in which the copolyamide has a melting point of less than or equal to 160° C.

According to embodiments, the copolyamide is chosen from the group consisting of copolyamide 6/11, copolyamide 6/12, copolyamide 6.6/11, copolyamide 6.6/12, copolyamide 6.10/11, copolyamide 6/12/11, copolyamide Pip.12/12, Pip representing piperazine, copolyamide 6/6.6/12, copolyamide 6/Pip.12/12 or a combination thereof.

According to embodiments, the copolyamide is present, relative to the total mass of the powder, in an amount of greater than or equal to 80% by mass, preferably greater than or equal to 90% by mass, more preferentially greater than or equal to 95% by mass.

According to embodiments, the powder also comprises a second polymer with a melting point below that of the copolyamide.

According to embodiments, the second polymer is a second copolyamide and/or an epoxy resin.

According to embodiments, the second polymer has a melting point of less than or equal to 130° C.

According to embodiments, the second polymer is present, relative to the total mass of the powder, in an amount of less than or equal to 10% by mass, preferably less than or equal to 5% by mass.

According to embodiments, the powder also comprises one or more additives chosen from the group consisting of pigments or dyes, anti-crater agents or spreading agents, reducing agents, antioxidants, reinforcing fillers, UV stabilizers, fluidizing agents and corrosion inhibitors.

According to embodiments, the mass amount of the additive(s), relative to the total mass of the powder, is from 0 to 30%, preferably from 0 to 10%, more preferentially from 0 to 5%.

According to embodiments, the copolyamide has a melting point of less than or equal to 150° C., preferably less than or equal to 145° C.

According to embodiments, the powder has an inherent viscosity of greater than or equal to 0.9, preferably greater than or equal to 1, in $(g/100 \, g)^{-1}$.

According to embodiments, the powder comprises copolyamide-based particles with a volume median diameter Dv50 of from 10 to 400 μm, preferably from 50 to 200 μm.

The invention also relates to a film which may be obtained by melting the powder as described above.

The invention also relates to the use of a powder as described above for coating a surface, the coating having an inherent viscosity of greater than or equal to 0.8 $(g/100 \, g)^{-1}$.

According to embodiments, the surface is an optionally treated metal surface.

According to embodiments, the coating is a film with a thickness of from 100 to 550 μm, preferably from 200 to 500 μm.

The invention also relates to a process for coating a surface, preferably a metal surface, comprising the following steps:

placing the surface in contact with the powder as described above;
melting the powder.

According to embodiments, the step of placing the surface in contact with the powder comprises the steps of:

heating the surface to a temperature above the melting point of the copolyamide, preferably at least 30° C. above the melting point of the copolyamide;
dipping the surface in a fluidized bed comprising the powder.

According to embodiments, the step of placing the surface in contact with the powder comprises the steps of:

electrically charging the powder;
spraying the electrically charged powder onto the surface;
heating the surface covered with the powder to a temperature above the melting point of the copolyamide, preferably at least 30° C. above the melting point of the copolyamide.

According to embodiments, the step of placing the surface in contact with the powder comprises the steps of:

heating the surface to a temperature above the melting point of the copolyamide, preferably at least 30° C. above the melting point of the copolyamide;

spraying the powder onto the surface.

The invention also relates to an object comprising a surface covered with a coating which may be obtained by melting the powder as described above.

The present invention makes it possible to satisfy the need expressed above. The invention more particularly provides a polyamide powder which allows both an application at a relatively low temperature (and is thus suitable for coating heat-sensitive surfaces such as heat-sensitive metal surfaces), and the production of a coating having an increased thickness and good mechanical properties.

This is accomplished by means of a powder based on a copolyamide with a low melting point (i.e. less than 160° C.) and having an inherent viscosity of greater than or equal to 0.8 $(g/100\ g)^{-1}$.

DESCRIPTION OF EMBODIMENTS OF THE INVENTION

The invention is now described in greater detail and in a non-limiting manner in the description that follows.

Unless otherwise indicated, all the percentages concerning amounts are mass percentages.

In the present patent application, the term "copolyamide-based" should be understood as meaning "based on one or more copolyamides". This is likewise the case for all the other components (for example the term "an epoxy resin" should be understood as meaning "one or more epoxy resins").

Powder

According to a first aspect, the invention relates to a copolyamide-based powder with an inherent viscosity of greater than or equal to 0.8 $(g/100\ g)^{-1}$, in which the copolyamide has a melting point of less than or equal to 160° C. This powder is intended to form a coating on a surface.

The melting point may be measured according to the standard ISO 11357-3 Plastics—Differential scanning calorimetry (DSC) Part 3.

The inherent viscosity is measured using an Ubbelhode tube. The measurement is taken at 20° C. on a 75 mg sample at a concentration of 0.5% (m/m) in m-cresol. The inherent viscosity is expressed in $(g/100\ g)^{-1}$ and is calculated according to the following formula:

$$\text{Inherent viscosity} = \ln(t_s/t_0) \times 1/C, \text{ with } C = m/p \times 100,$$

in which $t_s$ is the flow time of the solution, $t_0$ is the flow time of the solvent, m is the mass of the sample whose viscosity is determined and p is the mass of the solvent. This measurement corresponds to the standard ISO 307 apart from the fact that the measuring temperature is 20° C. instead of 25° C.

The term "copolyamide" means the products of polymerization of at least two different monomers chosen from:

monomers of amino acid or aminocarboxylic acid type, and preferably α,ω-aminocarboxylic acids;

monomers of lactam type containing from 3 to 18 carbon atoms on the main ring and which may be substituted;

monomers of "diamine.diacid" type derived from the reaction between an aliphatic diamine containing from 2 to 36 carbon atoms, preferably from 4 to 18 carbon atoms, and a carboxylic diacid containing from 4 to 36 carbon atoms, preferably from 4 to 18 carbon atoms; and mixtures thereof, with monomers containing a different carbon number in the case of mixtures between a monomer of amino acid type and a monomer of lactam type.

In the present description of the copolyamides, the term "monomer" should be taken as meaning "repeating unit". Indeed, the case where a repeating unit of the polyamide (PA) consists of the combination of a diacid with a diamine is particular. It is considered that it is the combination of a diamine and a diacid, that is to say the diamine.diacid pair (in an equimolar amount), which corresponds to the monomer. This is explained by the fact that, individually, the diacid or the diamine is only a structural unit, which is not enough on its own to be polymerized.

Monomers of Amino Acid Type:

As examples of α,ω-amino acids, mention may be made of those containing from 4 to 18 carbon atoms, such as aminocaproic acid, 7-aminoheptanoic acid, 11-aminoundecanoic acid, N-heptyl-11-aminoundecanoic acid and 12-aminododecanoic acid.

Monomers of Lactam Type:

As examples of lactams, mention may be made of those containing from 3 to 18 carbon atoms on the main ring and which may be substituted. Mention may be made, for example, of β,β-dimethylpropiolactam, α,α-dimethylpropriolactam, amylolactam, caprolactam also known as lactam 6, capryllactam, also known as lactam 8, oenantholactam, and lauryllactam, also known as lactam 12.

Monomers of "Diamine.Diacid" Type:

As examples of dicarboxylic acids, mention may be made of acids containing from 4 to 36 carbon atoms. Mention may be made, for example, of adipic acid, sebacic acid, azelaic acid, suberic acid, isophthalic acid, butanedioic acid, 1,4-cyclohexyldicarboxylic acid, terephthalic acid, the sodium or lithium salt of sulfoisophthalic acid, dimerized fatty acids (these dimerized fatty acids have a dimer content of at least 98% and are preferably hydrogenated) and dodecanedioic acid HOOC—$(CH_2)_{10}$—COOH and tetradecanedioic acid.

The term "fatty acid dimers" or "dimerized fatty acids" more particularly means the product of the dimerization reaction of fatty acids (generally containing 18 carbon atoms, often a mixture of oleic and/or linoleic acid). It is preferably a mixture comprising from 0 to 15% of C18 monoacids, from 60% to 99% of C36 diacids, and from 0.2% to 35% of triacids or polyacids of C54 or more.

As examples of diamines, mention may be made of aliphatic diamines containing from 2 to 36 atoms, preferably from 4 to 18 atoms, which may be arylic and/or saturated cyclic. Examples that may be mentioned include hexamethylenediamine, piperazine (abbreviated as "Pip"), aminoethylenepiperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPMD), bis(aminocyclohexyl)methane (BACM), bis(3-methyl-4-aminocyclohexyl)methane (BMACM), meta-xylyenediamine and bis-p-aminocyclohexylmethane.

As examples of diamine.diacids, mention may be made more particularly of those resulting from the condensation of 1,6-hexamethylenediamine with a dicarboxylic acid containing from 6 to 36 carbon atoms and those resulting from the condensation of 1,10-decamethylenediamine with a diacid containing from 6 to 36 carbon atoms.

As examples of monomers of "diamine.diacid" type, mention may be made notably of the monomers: 6.6, 6.10, 6.11, 6.12, 6.14, 6.18. Mention may be made of monomers resulting from the condensation of decanediamine with a C6 to C36 diacid, notably the monomers: 10.10, 10.12, 10.14, 10.18. In the numeral notation X.Y, X represents the number of carbon atoms derived from the diamine residues and Y represents the number of carbon atoms derived from the diacid residues, as is conventional.

The copolyamide preferably comprises at least one of the following monomers: 4.6, 4.T, 5.6, 5.9, 5.10, 5.12, 5.13, 5.14, 5.16, 5.18, 5.36, 6, 6.6, 6.9, 6.10, 6.12, 6.13, 6.14, 6.16, 6.18, 6.36, 6.T, 9, 10.6, 10.9, 10.10, 10.12, 10.13, 10.14, 10.16, 10.18, 10.36, 10.T, 11, 12, 12.6, 12.9, 12.10, 12.12, 12.13, 12.14, 12.16, 12.18, 12.36, 12.T, and mixtures thereof.

As examples of copolyamides formed from the various types of monomers described above, mention may be made of copolyamides resulting from the condensation of at least two α,ω-aminocarboxylic acids or of two lactams or of one lactam and one α,ω-aminocarboxylic acid. Mention may also be made of copolyamides resulting from the condensation of at least one α,ω-aminocarboxylic acid (or a lactam), at least one diamine and at least one dicarboxylic acid. Mention may also be made of copolyamides resulting from the condensation of an aliphatic diamine with an aliphatic dicarboxylic acid and of at least one other monomer chosen from aliphatic diamines different from the preceding one and aliphatic diacids different from the preceding one.

In a particularly advantageous manner, the copolyamide according to the invention is copolyamide 6/11, copolyamide 6/12, copolyamide 6.6/11, copolyamide 6.6/12, copolyamide 6.10/11, copolyamide 6/12/11, copolyamide Pip.12/12, copolyamide 6/6.6/12, copolyamide 6/Pip.12/12 or a combination thereof.

In the numeral notation X, X represents the number of carbon atoms derived from amino acid or lactam residues. The numeral notations X/Y, PA Z.Z'/Y, etc. relate to copolyamides in which X, Y, Z.Z', etc. represent homopolyamide units as described above.

The term "copolyamide-based" means that the powder comprises at least 50% by mass of copolyamide. However, in embodiments, the powder comprises an amount of copolyamide greater than or equal to 55% by mass, or greater than or equal to 60% by mass, or greater than or equal to 65% by mass, or greater than or equal to 70% by mass, or greater than or equal to 75% by mass, or greater than or equal to 80% by mass, or greater than or equal to 85% by mass, or greater than or equal to 90% by mass, or greater than or equal to 95% by mass, or greater than or equal to 98% by mass, or greater than or equal to 99% by mass, or greater than or equal to 99.5% by mass.

The copolyamide according to the invention has a melting point of less than or equal to 160° C. Preferably, the copolyamide has a melting point of less than or equal to 150° C., more preferentially less than or equal to 145° C. The copolyamide may also have a melting point of less than or equal to 155° C., or less than or equal to 140° C., or less than or equal to 135° C., or less than or equal to 130° C., or less than or equal to 125° C.

The powder according to the invention has an inherent viscosity of greater than or equal to 0.8. Advantageously, it has an inherent viscosity of greater than or equal to 0.9 and even more preferentially greater than or equal to 1. In certain embodiments, the powder has an inherent viscosity of greater than or equal to 0.85, or greater than or equal to 0.95, or greater than or equal to 1.05, or greater than or equal to 1.1, or greater than or equal to 1.15, or greater than or equal to 1.2, or greater than or equal to 1.25, or greater than or equal to 1.3. In the foregoing, the inherent viscosity is expressed in $(g/100\ g)^{-1}$.

Preferably, the volume median diameter Dv50 of the copolyamide-based particles of the powder is from 10 to 400 µm, more preferentially from 50 to 200 µm. The Dv50 of the copolyamide-based particles of the powder of the invention may be from 10 to 50 µm, or from 50 to 100 µm, or from 100 to 150 µm, or from 150 to 200 µm, or from 200 to 250 µm, or from 250 to 300 µm, or from 300 to 350 µm, or from 350 to 400 µm.

The Dv50 corresponds to the particle size at the $50^{th}$ percentile (in volume) of the cumulative particle size distribution. It may be determined by laser particle size analysis.

The powder may also comprise, besides the copolymer with a melting point of less than or equal to 160° C., a second polymer with a melting point below that of the copolyamide.

The presence of this second polymer may allow better heat transfer to the powder and improve the melting of the powder particles during the application of the coating. Specifically, the particles of the second polymer will be able, during the coating process, to melt before the particles of the copolyamide. The second molten polymer will then allow agglomeration of the particles of the copolyamide, which will improve their melting. This may make it possible to obtain a coating of increased thickness, when compared with a coating obtained with a powder free of second polymer. In addition, the presence of this second polymer may make it possible to improve the adhesion of the coating to the surface, in particular if it is a metal surface, and may also aid in producing a coating having a satisfactory appearance.

The second polymer may be a second copolyamide, such as those mentioned above. In particular, the second copolyamide may be a copolyamide 6/6.6/11/12, a copolyamide 6/11, a copolyamide 6/12, a copolyamide 6.6/11, a copolyamide 6.6/12, a copolyamide 6.10/11, a copolyamide 6/12/11, a copolyamide Pip.12/12, a copolyamide 6/6.6/12, a copolyamide 6/Pip.12/12 or a combination thereof.

The second polymer may also be an epoxy resin. An example of epoxy resins that may be used in the invention is sulfonamide resins. As epoxy resins that may be used in the invention, mention may also be made of bisphenol A diglycidyl ethers, bisphenol F diglycidyl esters, novolac resin glycidyl ethers, novolac cresol epoxy resins, novolac phenolic epoxy resins, novolac alkylphenolic epoxy resins, epoxy acrylic resins, hydrogenated bisphenol A diglycidyl ethers, hydrogenated bisphenol AD diglycidyl ethers, diglycidyl ethers of a polyol such as propylene glycol or pentaerythritol, epoxy resins obtained by reaction of an aliphatic or aromatic carboxylic acid with epichlorohydrin, epoxy resins obtained by reaction of an aliphatic or aromatic amine with epichlorohydrin, heterocyclic epoxy resins, epoxy resins containing a spiro nucleus and modified resins containing an epoxy group. The above epoxy resins may be used alone or in combination.

The second polymer may also be a mixture of these epoxy resins.

The second polymer may have a melting point of less than or equal to 155° C., or less than or equal to 150° C., or less than or equal to 145° C., or less than or equal to 140° C., or less than or equal to 135° C., or less than or equal to 130° C., or less than or equal to 125°, or less than or equal to 120° C., or less than or equal to 115° C., or less than or equal to 110° C. Preferably, the second polymer has a melting point of less than or equal to 130° C.

Preferably, the second polymer is present, relative to the total mass of the powder, in an amount of less than or equal to 10% by mass, more preferentially in an amount of less than or equal to 5% by mass. For example, the second polymer may be present, relative to the total mass of the powder, in a mass amount ranging from 0 to 1%, or from 1% to 2%, or from 2% to 3%, or from 3% to 4%, or from 4% to 5%, or from 5% to 6%, or from 6% to 7%, or from 7% to 8%, or from 8% to 9%, or from 9% to 10%.

The powder according to the invention may also comprise one or more additives chosen from the group consisting of pigments or dyes, anti-crater agents or spreading agents, reducing agents, antioxidants, reinforcing fillers, UV stabilizers, fluidizing agents, corrosion inhibitors, or mixtures thereof. These additives are preferably present in a mass amount, relative to the total mass of the powder, of from 0 to 30%, more preferentially from 0 to 10%, even more preferentially from 0 to 5%, for example from 0 to 5%, or from 5% to 10%, or from 10% to 15%, or from 15% to 20%, or from 20% to 25%, or from 25% to 30%.

The reinforcing filler may be of any type that is suitable for preparing polyamide-based powders. However, it is preferable for the filler to be selected from the group consisting of talc, calcium carbonates, manganese carbonates, potassium silicates, aluminium silicates, dolomite, magnesium carbonates, quartz, boron nitride, kaolin, wollastonite, titanium dioxide, glass beads, mica, carbon black, mixtures of quartz, mica and chlorite, feldspar and dispersed nanometric fillers such as carbon nanotubes and silica. In a particularly preferred manner, the filler is calcium carbonate.

The pigment may be of any type known to a person skilled in the art. Preferably, the pigment is selected from the group consisting of titanium dioxide, carbon black, cobalt oxide, nickel titanate, molybdenum disulfide, aluminium flakes, iron oxide, zinc oxide, organic pigments, such as phthalocyanine and anthraquinone derivatives, and zinc phosphate.

The dye may be of any type known to a person skilled in the art. Preferably, the dye according to the invention is selected from the group consisting of azo dyes, anthraquinone dyes, indigo-based dyes, triarylmethane dyes, chlorine dyes and polymethine dyes.

The anti-crater agent and/or spreading agent may be of any type known to a person skilled in the art. Preferably, the anti-crater agent and/or spreading agent is selected from the group consisting of polyacrylate derivatives.

The UV stabilizer may be of any type known to a person skilled in the art. Preferably, the UV stabilizer is selected from the group consisting of resorcinol derivatives, benzotriazoles, phenyltriazines and salicylates.

The antioxidants may be of any type known to a person skilled in the art. Preferably, the antioxidants are selected from the group consisting of copper iodide combined with potassium iodide, phenol derivatives and hindered amines.

The fluidizing agent may be of any type known to a person skilled in the art. Preferably, the fluidizing agent is selected from the group consisting of aluminas and silicas.

The corrosion inhibitors may be of any type known to a person skilled in the art. Preferably, the corrosion inhibitors are selected from the group consisting of phosphosilicates and borosilicates.

In embodiments, the powder according to the invention consists essentially, or consists, of the copolyamide, optionally the second polymer, and optionally one or more additives as described above.

The invention also relates to a film that may be obtained by melting the powder as described above. Preferably, the film has a thickness of from 100 to 550 µm, more preferentially from 200 to 500 µm. In embodiments, the film has a thickness of from 100 to 150 µm, or from 150 to 200 µm, or from 200 to 250 µm, or from 250 to 300 µm, or from 300 to 350 µm, or from 350 to 400 µm, or from 400 to 450 µm, or from 450 to 500 µm, or from 500 to 550 µm.

Process for Manufacturing the Powder

The powder according to the invention may be prepared by mixing the constituents (i.e. the copolyamide with a melting point of less than or equal to 160° C. and the other optional constituents such as the second polymer with a melting point below that of the copolyamide, the pigments or dyes, the anti-crater agents or spreading agents, the reducing agents, the antioxidants, the reinforcing fillers, the UV stabilizers, the fluidizing agents and the corrosion inhibitors) in molten form, notably in a blender. When the powder contains only the copolyamide, said copolyamide is melted. The mixture (or the copolyamide alone) is then milled after it has solidified.

Alternatively, only some of the constituents (including the copolyamide with a melting point of less than or equal to 160° C.), for example the polymeric constituents, are melt-blended and then milled after solidification. The particles obtained are then dry-mixed with the other constituents in powder form, for example the pigments.

Preferably, the temperature of the melt-blending step is between 150° C. and 300° C., more preferentially between 180° C. and 270° C.

The milling may be performed via any means. Preferably, the milling is selected from the group consisting of hammer milling, knife milling, disc milling, air-jet milling and cryogenic milling.

The preparation process may also comprise a step of selecting the powder particles having the desired particle size.

Use for Coating a Surface

According to another aspect, the invention relates to the use of a powder as described above for coating a surface. The surface may be totally or partly coated. According to the invention, the coating has an inherent viscosity of greater than or equal to 0.8 $(g/100\ g)^{-1}$. The inherent viscosity is determined as described above. The inherent viscosity of the coating may be different from that of the powder. In particular, the inherent viscosity of the coating may be higher than that of the powder, due to the fact that one or more polymerization reactions may to a certain extent take place or resume during the application of the coating.

The use of the powder according to the invention for coating a surface differs from a use as mastic or adhesive. Specifically, after application, the coating often forms an essentially undeformable solid layer. Furthermore, the coating is not used to bond two substrates together.

The surface is preferably a metal surface. The term "metal surface" means a surface which comprises, consists essentially of or consists of one or more metals.

The metal surface may be of any type. Preferably, the metal surface is the surface of a part selected from the group consisting of ordinary or galvanized steel parts, aluminium parts or aluminium alloy parts.

The surface, preferably the metal surface, more preferably the surface of the ordinary steel, aluminium or aluminium alloy part, was able to undergo one or more surface treatments that are well known to a person skilled in the art and preferably selected from the group consisting of coarse degreasing, alkaline degreasing, brushing, shot-blasting or sand-blasting, fine degreasing, hot rinsing, phosphating degreasing, iron/zinc/tri-cation phosphatations, chromating, cold rinsing and chromic rinsing. Thus, the powder may be used for coating treated or untreated metal surfaces.

The present invention is particularly advantageous for the coating of heat-sensitive surfaces, in particular heat-sensitive metal surfaces. For the purposes of the present invention, the term "heat-sensitive" means: "liable to be impaired by the application of temperatures above 250° C.". Such surfaces are, for example, surfaces comprising an alloy of zinc and aluminium. They may also be surfaces which have undergone a heat-sensitive treatment. The present invention may also allow the coating of surfaces that are liable to be impaired by the application of temperatures below 250° C.; for example, the invention may allow the coating of surfaces that are liable to be impaired by the application of temperatures above 230° C.

Advantageously, the surface intended to be coated is selected from the group consisting of smooth or shot-blasted degreased steel, phosphated degreased steel, iron or zinc phosphated steel, Sendzimir galvanized steel, electro-galvanized steel, bath-galvanized steel, cataphoresis-treated steel, chromated steel, anodized steel, corundum sand-blasted steel, degreased aluminium, smooth or shot-blasted aluminium, chromated aluminium, cast iron and any other metal alloy.

In certain embodiments, the coating has an inherent viscosity of greater than or equal to 0.85, or greater than or equal to 0.9, or greater than or equal to 0.95, or greater than or equal to 1.05, or greater than or equal to 1, or greater than or equal to 1.1, or greater than or equal to 1.15, or greater than or equal to 1.2, or greater than or equal to 1.25, or greater than or equal to 1.3. In the foregoing, the inherent viscosity is expressed in $(g/100\ g)^{-1}$.

Preferably, the coating is a film with a thickness of from 100 to 550 µm, more preferentially from 200 to 500 µm. In embodiments, the film has a thickness of from 100 to 150 µm, or from 150 to 200 µm, or from 200 to 250 µm, or from 250 to 300 µm, or from 300 to 350 µm, or from 350 to 400 µm, or from 400 to 450 µm, or from 450 to 500 µm, or from 500 to 550 µm.

A subject of the invention is also a process for coating a surface, comprising the following steps:
  placing the surface in contact with the powder as described above;
  melting the powder.

The powder may be applied onto or placed in contact with a surface according to numerous coating techniques that are well known to a person skilled in the art. Preferably, the coating according to the invention is performed via a method selected from the group consisting of dipping in a fluidized bed, electrostatic spraying and hot dusting.

The coating may notably be performed by dipping in a fluidized bed. Thus, the step of placing the surface in contact with the powder may comprise the steps of:
  heating the surface to a temperature above the melting point of the copolyamide;
  dipping the surface in a fluidized bed comprising the powder.

The surface to be coated is preheated to a temperature allowing the melting of the powder according to the invention. The surface is then immersed in a fluidized bed comprising a powder according to the invention. The powder melts on contact with the surface and forms a coating thereon. The coated surface is then preferably cooled, for example in the ambient air.

Preferably, the fluidized air for the fluidization of the composition is cold, clean and free of oil.

Preferably, the surface heating temperature is less than or equal to 250° C., more preferentially less than or equal to 230° C. Thus, the surface heating temperature may be from 150 to 250° C., preferably from 170 to 230° C.

Preferably also, the heating of the surface is performed to a temperature at least 30° C. above the melting point of the copolyamide, more preferentially to a temperature from 30 to 120° C. above the melting point of the copolyamide.

Preferably, the duration of dipping of the surface in the fluidized bed is from 1 to 10 seconds, more preferentially from 3 to 7 seconds. Dipping of the surface in the fluidized bed may take place one or more times (each dipping preferably having a duration of from 1 to 10 seconds, more preferentially from 3 to 7 seconds).

Alternatively, the coating may be performed by electrostatic spraying. The step of placing the surface in contact with the powder may then comprise the steps of:
  electrically charging the powder;
  spraying the electrically charged powder onto the surface;
  heating the surface covered with the powder to a temperature above the melting point of the copolyamide.

Coating by electrostatic spraying consists in depositing electrostatically charged powder particles onto a surface, notably at room temperature. The powder may be electrostatically charged during its passage through the nozzle of spraying equipment. The composition thus charged can then be sprayed onto the object comprising the surface to be coated, which is connected to a zero potential. The coated object can then be placed in an oven at a temperature allowing melting of the composition.

The powder spraying equipment may be of any type. Preferably, the nozzle is brought to a high potential of between about 10 and about 100 kV, of negative or positive polarity. Preferably, the powder spraying equipment is an electrostatic gun which charges the powder by the Corona effect and/or by triboelectrization.

Preferably, the powder flow rate in the spraying equipment is from 10 to 200 g/minute and more preferably from 50 to 120 g/minute.

Preferably, the temperature of electrostatic application of the powder is from 15° C. to 25° C.

Preferably, the residence time of the surface in the oven is from 3 to 15 minutes.

Advantageously, the heating temperature of the surface covered with powder may be less than or equal to 250° C., more preferentially less than or equal to 230° C. Thus, the surface heating temperature may be from 150 to 250° C., preferably from 170 to 230° C.

The heating temperature of the surface covered with powder may preferably be at least 30° C. above the melting point of the copolyamide, more preferably from 30 to 60° C. above the melting point of the copolyamide.

The surface may then be cooled, for example to room temperature.

In other embodiments, the coating is performed by hot dusting. The step of placing the surface in contact with the powder then comprises the steps of:
  heating the surface to a temperature above the melting point of the copolyamide;
  spraying the powder onto the surface.

The surface heating temperature may be as described above in relation with coating by dipping in a fluidized bed. It is notably preferably at least 30° C. above the melting point of the copolyamide, more preferably from 30 to 120° C. above the melting point of the copolyamide.

The surface may then be cooled, for example to room temperature. The sprayed powder may or may not be electrostatically charged.

The characteristics described above in relation with the use of the powder for coating a surface (notably regarding the description of the surface, the inherent viscosity of the coating and the thickness of the coating film) may apply in the same manner to the coating processes.

According to another aspect, the invention relates to an object comprising a surface covered with a coating that may be obtained by melting the powder as described above.

This object is preferably intended:
for transferring fluids, notably in the form of pipework, accessories, pumps or valves;
for motor vehicles, notably in the form of splined shafts, sliding door rails or springs;
for wirework articles, notably in the form of dishwasher baskets or springs.

EXAMPLES

The following examples illustrate the invention without limiting it.

Synthesis of the Copolyamide Powders

The starting materials (i.e. the copolyamides) are introduced into a 14 L autoclave, with water, an antioxidant (Irganox 1098) and phosphoric acid. The medium is rendered inert by placing it under vacuum and introducing nitrogen, four times in succession. The medium is then stirred and heated under autogenous pressure at a temperature of 28000 for 3 hours. Depressurization to atmospheric pressure is then applied over a ramp of 2 hours, the temperature being gradually lowered to 230° C. The medium is then stirred while flushing with nitrogen and increases in viscosity until the desired stirring torque is reached. The medium is then emptied out through a die in rod form into a water bath, and then into a granulator.

The granules are then cryo-milled in powder form. The Dv50 is 100 µm.

Preparation of the Compositions (Coating Powders):

The following compositions are prepared, by dry-mixing of the components in the amounts (indicated in parts) specified in the table below:

|  | Composition No. | | | | | | |
| --- | --- | --- | --- | --- | --- | --- | --- |
|  | 1 | 2 | 3 | 3bis | 4 | 5 | 6 |
| Polyamide 11 powder | 0 | 0 | 0 | 0 | 0 | 0 | 0 |
| Copolyamide Pip.12/12 powder (35/65 by mass) | 1000 | 1000 | 1000 | 1000 | 1000 | 1000 | 1000 |
| Copolyamide 6/11/12 powder (25/20/55 by mass) | 0 | 0 | 0 | 0 | 0 | 0 | 0 |
| Copolyamide 6/6.6/12 powder (22/18/60 by mass) | 0 | 0 | 0 | 0 | 0 | 0 | 0 |
| Black pigment (Monarch 120) | 0 | 0 | 4 | 4 | 4 | 4 | 4 |
| Anti-crater agent (Byk-354) | 0 | 0.75 | 0.75 | 0.75 | 0.40 | 0.75 | 0.40 |
| Epoxy resin powder (SR9) | 0 | 0 | 0 | 0 | 10 | 15 | 10 |

|  | Composition No. | | | | | |
| --- | --- | --- | --- | --- | --- | --- |
|  | 7 | 8 | 9 | 10 | 11 | 12 |
| Polyamide 11 powder |  |  |  |  |  | 1000 |
| Copolyamide Pip.12/12 powder | 1000 | 1000 | 0 | 0 | 0 | 0 |
| Copolyamide 6/11/12 powder | 0 | 0 | 1000 | 1000 | 0 | 0 |
| Copolyamide 6/6.6/12 powder | 0 | 0 | 0 | 0 | 1000 | 0 |
| Black pigment (Monarch 120) | 4 | 4 | 4 | 4 | 4 | 0 |
| Anti-crater agent (Byk-354) | 0.40 | 0.75 | 0.40 | 0.75 | 0.40 | 0 |
| Epoxy resin powder (SR9) | 20 | 15 | 20 | 15 | 20 | 0 |

Pip = piperazine.

The polyamides used have the following melting points and inherent viscosities:

| Polyamide | Melting point (° C.) | Inherent viscosity ((g/100 g)$^{-1}$) |
| --- | --- | --- |
| Polyamide 11 powder | 186 | 1.3 |
| Copolyamide Pip.12/12 powder | 143 | 1.09 |
| Copolyamide 6/11/12 powder | 126 | 1.3 |
| Copolyamide 6/6.6/12 powder | 128 | 0.74 |

Formation and Properties of the Coatings

A coating is deposited onto a metal by dipping into a fluidized bed with the various compositions (powders) described above.

The parameters for the application of the coating by dipping in the fluidized bed are as follows:

| Composition No. | 1 | 2 | 3 | 3bis | 4 | 5 | 6 | 7 | 8 |
| --- | --- | --- | --- | --- | --- | --- | --- | --- | --- |
| Oven preheating temperature (° C.) | 230 | 230 | 230 | 230 | 230 | 230 | 230 | 230 | 230 |
| Preheating time (min) | 5 | 5 | 5 | 5 | 5 | 5 | 5 | 5 | 5 |
| Dipping time x number of successive dippings | 7 s x 1 | 7 s x 1 | 3 s x 2 | 3 s x 2 | 3 s x 2 | 3 s x 2 | 3 s x 2 | 3 s x 2 | 3 s x 2 |

| | | | | | | | | | |
|---|---|---|---|---|---|---|---|---|---|
| Oven post-melting temperature (° C.) | 230 | 230 | 230 | 230 | 230 | 230 | 230 | 230 | 230 |
| Post-melting time (min) | 5 | 5 | 3 | 15 | 15 | 15 | 15 | 15 | 15 |
| Water cooling | none | none | none | none | none | none | yes | none | yes |

| Composition No. | 9 | 10 | 11 | 12 |
|---|---|---|---|---|
| Oven preheating temperature (° C.) | 230 | 230 | 230 | 230 |
| Preheating time (min) | 5 | 5 | 5 | 5 |
| Dipping time × number of successive dippings | 3 s × 2 | 3 s × 2 | 3 s × 2 | 3 s × 2 |
| Oven post-melting temperature (° C.) | 230 | 230 | 230 | 230 |
| Post-melting time (min) | 15 | 15 | 15 | 15 |
| Water cooling | none | yes | none | none |

The thickness of the coating, its appearance, its gloss (at an angle of 20° and of 60°), its inherent viscosity and its mechanical properties (breaking stress, yield point and elongation at break) are determined.

The inherent viscosity is measured as described above. The gloss is measured according to the standard ISO 2813. The breaking stress, the yield point and the elongation at break are measured according to the standard ISO 527-3.

The results are collated in the tables below:

Compositions 11 and 12 correspond to counterexamples.

It is found that when the inherent viscosity of the coating is less than 0.8 $(g/100\ g)^{-1}$, the coating film obtained is brittle and does not have good mechanical properties. It is also found that the application of a coating at low temperature (230° C.) is not possible when the coating powder is a polyamide powder with a relatively high melting point (186° C.).

| Composition No. | 1 | 2 | 3 | 3bis | 4 | 5 | 6 |
|---|---|---|---|---|---|---|---|
| Coating thickness (μm) | 280-300 | 230 | 120-130 | 120-130 | 250-300 | 320-380 | 220-340 |
| Appearance of the coating | Orange peel | OK | Perforations | Perforations | OK | OK | OK |
| Gloss (angle of 20°) (GU) | ND | ND | 5.4 | 5.4 | 8.4 | 5.9 | 35.4 |
| Gloss (angle of 60°) (GU) | ND | ND | 37.1 | 37.1 | 44 | 38.6 | 85.3 |
| Inherent viscosity in $(g/100\ g)^{-1}$ | | | | 1.09 | | | |
| Breaking stress (MPa) | 25 | 24 | 25 | 25 | 24 | 25 | 23 |
| Yield point (%) | 5.1 | 4.8 | 5.1 | 5.1 | 4.7 | 5.1 | 5.0 |
| Elongation at break (%) | 608 | 655 | 608 | 608 | 650 | 608 | 690 |

| Composition No. | 7 | 8 | 9 | 10 | 11 | 12 |
|---|---|---|---|---|---|---|
| Coating thickness (μm) | 280-320 | 300-320 | 430-460 | 430-460 | 320-380 | Low particle coalescence: no coating formed |
| Appearance of the coating | OK | OK | OK | OK | OK | |
| Gloss (angle of 20°) (GU) | 9 | 36.6 | 34.4 | 47.5 | 5.9 | |
| Gloss (angle of 60°) (GU) | 45.7 | 93.6 | 89 | 97.1 | 38.6 | |
| Inherent viscosity in $(g/100\ g)^{-1}$ | | 1.09 | | 1.3 | 0.74 | |
| Breaking stress (MPa) | | 25 | | 21 | Brittle film | |
| Yield point (%) | | 5.1 | | 10 | | |
| Elongation at break (%) | | 608 | | 318 | | |

ND = not determined.

The invention claimed is:

1. A copolyamide-based powder configured for forming a coating on a metal surface, the copolyamide-based powder comprising:
   a copolyamide; and
   a second polymer,
   wherein the copolyamide-based powder has an inherent viscosity of greater than or equal to 0.8 $(g/100\ g)^{-1}$,
   wherein the copolyamide has a melting point of less than or equal to 160° C.,
   wherein the second polymer has a melting point below that of the copolyamide,
   wherein the inherent viscosity is calculated according to the following formula:

Inherent viscosity=$\ln(t_s/t_0) \times 1/C$, with $C=m/p \times 100$, in which $t_s$ is the flow time of the solution, $t_0$ is the flow time of the solvent, m is the mass of the sample whose viscosity is determined and p is the mass of the solvent, wherein the inherent viscosity is measured at a measurement temperature of 20° C.

2. The copolyamide-based powder according to claim 1, in which the copolyamide is chosen from the group consisting of copolyamide 6/11, copolyamide 6/12, copolyamide 6.6/11, copolyamide 6.6/12, copolyamide 6.10/11, copolyamide 6/12/11, copolyamide Pip.12/12, Pip representing piperazine, copolyamide 6/6.6/12, copolyamide 6/Pip.12/12 or a combination thereof.

3. The copolyamide-based powder according to claim 1, in which the copolyamide is present, relative to the total mass of the powder, in an amount of greater than or equal to 80% by mass.

4. The copolyamide-based powder according to claim 1, in which the second polymer is a second copolyamide and/or an epoxy resin.

5. The copolyamide-based powder according to claim 1, in which the second polymer has a melting point of less than or equal to 130° C.

6. The copolyamide-based powder according to claim 1, in which the second polymer is present, relative to the total mass of the powder, in an amount of less than or equal to 10% by mass.

7. The copolyamide-based powder according to claim 1, also comprising one or more additives chosen from the group consisting of pigments or dyes, polyacrylate derivatives, reducing agents, antioxidants, reinforcing fillers, UV stabilizers, fluidizing agents and corrosion inhibitors.

8. The copolyamide-based powder according to claim 7, in which the mass amount of the additive(s), relative to the total mass of the powder, is from above 0 to 30%.

9. The copolyamide-based powder according to claim 1, in which the copolyamide has a melting point of less than or equal to 150° C.

10. The copolyamide-based powder according to claim 1, having an inherent viscosity of greater than or equal to 0.9 in $(g/100\ g)^{-1}$.

11. The copolyamide-based powder according to claim 1, comprising copolyamide-based particles with a volume median diameter Dv50 of from 10 to 400 µm.

12. A film obtained by melting the powder according to claim 1.

13. A process for coating a metal surface, comprising the following steps:
   placing the metal surface in contact with the powder according to claim 1;
   melting the powder.

14. The process according to claim 13, in which the step of placing the metal surface in contact with the powder comprises the steps of:
   heating the metal surface to a temperature above the melting point of the copolyamide,
   dipping the metal surface in a fluidized bed comprising the powder.

15. The process according to claim 13, in which the step of placing the metal surface in contact with the powder comprises the steps of:
   electrically charging the powder;
   spraying the electrically charged powder onto the metal surface;
   heating the metal surface covered with the powder to a temperature above the melting point of the copolyamide.

16. The process according to claim 13, in which the step of placing the metal surface in contact with the powder comprises the steps of:
   heating the metal surface to a temperature above the melting point of the copolyamide,
   spraying the powder onto the metal surface.

17. An object comprising a metal surface covered with a coating obtained by melting the powder according to claim 1.

18. The copolyamide-based powder according to claim 1, having an inherent viscosity of greater than or equal to 1.10 in $(g/100\ g)^{-1}$.

19. The copolyamide-based powder according to claim 1, having an inherent viscosity of greater than or equal to 1.15 in $(g/100\ g)^{-1}$.

20. The copolyamide-based powder according to claim 1, the powder further comprising an anti-cratering agent, wherein the anti-crater agent is selected from the group consisting of polyacrylate derivatives.

21. A copolyamide-based powder configured for forming a coating on a metal surface, the copolyamide-based powder comprising:
   a copolyamide; and
   an anti-cratering agent, wherein the anti-crater agent is selected from the group consisting of polyacrylate derivatives,
   wherein the copolyamide-based powder has an inherent viscosity of greater than or equal to 0.8 $(g/100\ g)^{-1}$,
   wherein the copolyamide has a melting point of less than or equal to 160° C.,
   wherein the inherent viscosity is calculated according to the following formula:

Inherent viscosity=$\ln(t_s/t_0) \times 1/C$, with $C=m/p \times 100$, in which $t_s$ is the flow time of the solution, $t_0$ is the flow time of the solvent, m is the mass of the sample whose viscosity is determined and p is the mass of the solvent, wherein the inherent viscosity is measured at a measurement temperature of 20° C.

22. The copolyamide-based powder according to claim 21, wherein the copolyamide is chosen from the group consisting of copolyamide 6/11, copolyamide 6/12, copolyamide 6.6/11, copolyamide 6.6/12, copolyamide 6.10/11, copolyamide 6/12/11, copolyamide Pip.12/12, Pip representing piperazine, copolyamide 6/Pip.12/12 or a combination thereof.

* * * * *